United States Patent
Zheng et al.

(10) Patent No.: US 12,049,270 B2
(45) Date of Patent: *Jul. 30, 2024

(54) MANAGING REDUNDANT STEERING SYSTEM FOR AUTONOMOUS VEHICLES

(71) Applicant: TuSimple, Inc., San Diego, CA (US)

(72) Inventors: Kaixin Zheng, San Diego, CA (US); Xiaoling Han, San Diego, CA (US); Zehua Huang, San Diego, CA (US)

(73) Assignee: TUSIMPLE, INC., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/157,204

(22) Filed: Jan. 20, 2023

(65) Prior Publication Data
US 2023/0150572 A1   May 18, 2023

Related U.S. Application Data

(63) Continuation of application No. 16/810,781, filed on Mar. 5, 2020, now Pat. No. 11,577,776.

(51) Int. Cl.
*B62D 6/00* (2006.01)
*B62D 5/04* (2006.01)
*G05D 1/00* (2024.01)

(52) U.S. Cl.
CPC ............ *B62D 6/00* (2013.01); *B62D 5/0409* (2013.01); *B62D 5/0421* (2013.01); *B62D 5/0463* (2013.01); *G05D 1/0088* (2013.01)

(58) Field of Classification Search
CPC ...... B62D 6/00; B62D 5/0409; B62D 5/0421; B62D 5/0463; G05D 1/0088
See application file for complete search history.

(56) References Cited

U.S. PATENT DOCUMENTS

| | | | |
|---|---|---|---|
| 2012/0055730 A1 | 3/2012 | Mukai et al. | |
| 2012/0303218 A1* | 11/2012 | Tamura | B62D 1/046 701/41 |

(Continued)

FOREIGN PATENT DOCUMENTS

| | | |
|---|---|---|
| DE | 102015116937 A1 | 4/2017 |
| KR | 101878939 B1 | 7/2018 |
| WO | 2017028788 A1 | 2/2017 |

OTHER PUBLICATIONS

Extended European Search Report for European Patent Application No. 21160671.0, mailed Jul. 2, 2021 (9 pages).

*Primary Examiner* — Thomas Ingram
(74) *Attorney, Agent, or Firm* — Perkins Coie LLP

(57) ABSTRACT

Techniques are described for managing redundant steering system for a vehicle. A method includes sending a first control command that instructs a first motor coupled to a steering wheel in a steering system to steer a vehicle, receiving, after sending the first control command, a speed of the vehicle, a yaw rate of the vehicle, and a steering position of the steering wheel, determining, based at least on the speed and the yaw rate, an expected range of steering angles that describes values within which the first motor is expected to steer the vehicle based on the first control command, and upon determining that the steering position of a steering wheel is outside the expected range of steering angles, sending a second control command that instructs a second motor coupled to the steering wheel in the steering system to steer the vehicle.

20 Claims, 4 Drawing Sheets

(56) References Cited

U.S. PATENT DOCUMENTS

| | | | |
|---|---|---|---|
| 2017/0088167 A1* | 3/2017 | Fujii | B62D 15/025 |
| 2018/0029637 A1* | 2/2018 | She | B62D 5/04 |
| 2018/0304918 A1* | 10/2018 | Kunihiro | B62D 5/0463 |
| 2021/0276615 A1* | 9/2021 | Zheng | B62D 5/0409 |
| 2022/0089211 A1* | 3/2022 | Naik | H02P 6/17 |

\* cited by examiner

MANAGING REDUNDANT STEERING SYSTEM FOR AUTONOMOUS VEHICLES

CROSS-REFERENCE TO RELATED APPLICATIONS

This application is a continuation of U.S. patent application Ser. No. 16/810,781, filed on Mar. 5, 2020. The aforementioned application is incorporated by reference in its entirety.

TECHNICAL FIELD

This document relates to systems, apparatus, and methods to managing steering system of an autonomous vehicle.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may control the steering angle, a throttle amount to control the speed of the autonomous vehicle, gear changes, and/or a breaking amount to control the extent to which the brakes are engaged. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself.

SUMMARY

An exemplary method to control a vehicle includes sending a first control command that instructs a first motor coupled to a steering wheel in a steering system to steer a vehicle; receiving, after sending the first control command, a speed of the vehicle, a yaw rate of the vehicle, and a steering position of the steering wheel; determining an expected range of steering angles that describes values within which the first motor is expected to steer the vehicle based on the first control command, wherein the expected range of steering angles are determined as a function of at least the speed of the vehicle and the yaw rate of the vehicle; and upon determining that the steering position of a steering wheel is outside the expected range of steering angles, sending a second control command that instructs a second motor coupled to the steering wheel in the steering system to steer the vehicle.

In some embodiments, the first control command is based in part on a first pre-determined offset of a first position of the first motor within the steering system, and the second control command is based in part on a second pre-determined offset of a second position of the second motor within the steering system. In some embodiments, the expected range of steering angles are determined as the function at least the speed of the vehicle, the yaw rate of the vehicle, and the first pre-determined offset of the first motor. In some embodiments, the expected range of steering angles are determined as the function at least the speed of the vehicle, the yaw rate of the vehicle, and a third pre-determined offset that quantifies an amount by which the steering wheel of the vehicle is offset when the steering wheel is in a neutral position.

In some embodiments, the exemplary method further comprises receiving, from the first motor, a measured torque value that describes torque being applied by or on the first motor in response to the first control command; determining an expected torque value to be applied by the first motor based on the first control command; and increasing the expected range of steering angles upon determining that the measured torque value is outside a range of torque values that includes the expected torque value.

In some embodiments, the exemplary method further comprises upon determining that the steering position of the steering wheel is outside the expected range of steering angles, sending a third command that instructs the first motor to deactivate. In some embodiments, the first control command or the second control command include a position control command that indicates an amount of angular displacement or a position of a steering wheel of the steering system to be applied by the first motor or the second motor, respectively, or the first control command or the second control command include a torque control command that indicates an amount of torque to apply to the steering wheel by the first motor or the second motor, respectively.

In some embodiments, the exemplary method further includes upon determining that the steering position of the steering wheel is within the expected range of steering angles, operating the first motor of the steering system to steer the vehicle. In some embodiments, the first motor is located in a steering column of the steering system. In some embodiments, the second motor is located in a steering gear that is coupled to a steering shaft. In some embodiments, the first motor and the second motor are located at different locations in the steering system.

In yet another exemplary aspect, the above-described method is embodied in a non-transitory computer readable storage medium. The non-transitory computer readable storage medium includes code that when executed by a processor, causes the processor to perform the methods described in this patent document.

In yet another exemplary embodiment, a device or an apparatus that includes a processor configured or operable to perform the above-described methods is disclosed.

The above and other aspects and their implementations are described in greater detail in the drawings, the descriptions, and the claims.

DETAILED DESCRIPTION

A vehicle may operate in an autonomous mode to safely navigate on a road. In an autonomous mode, an in-vehicle control computer can control systems such as the steering system, a throttle, and/or a brake unit. This patent document describes exemplary techniques to monitor and enable healthy operation of a redundant steering system to provide safe autonomous vehicle operations. The exemplary techniques monitor the status and performance of steering motors that are part of a redundant steering system, where the steering motors may include shafts that rotate to turn the wheels of the autonomous vehicle to a desired position. The performance of the motors can be determined based on the information provided by the motors. The techniques described in this patent document can determine whether a part of the redundant steering system is faulty, whether the steering system has an offset, and the intention of a driver through a steering wheel.

Figure 1:
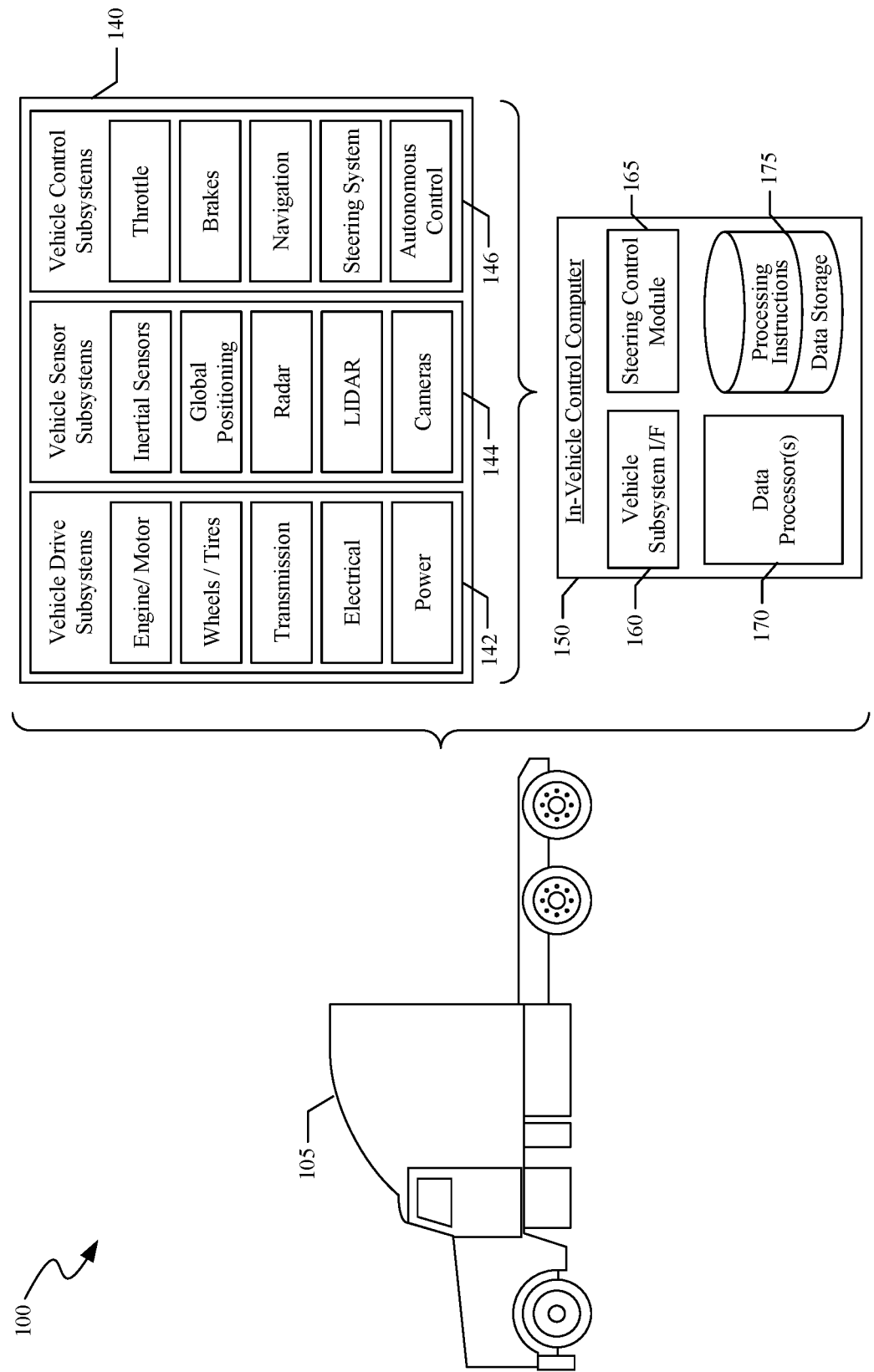
FIG. 1 shows a block diagram of an example vehicle ecosystem in which techniques for managing redundant steering system can be implemented.

FIG. 1 shows a block diagram of an example vehicle ecosystem 100 in which techniques for managing redundant steering system can be implemented in an in-vehicle control computer 150. The vehicle ecosystem 100 includes several systems and components that can generate and/or deliver one or more sources of information/data and related services to the in-vehicle control computer 150 that may be located in a vehicle 105. Examples of vehicle 105 include a car, a truck, or a semi-trailer truck. The in-vehicle control computer 150 can be in data communication with a plurality of vehicle subsystems 140, all of which can be resident in a user's vehicle 105. A vehicle subsystem interface 160 is provided to facilitate data communication between the in-vehicle control computer 150 and the plurality of vehicle subsystems 140.

The vehicle 105 may include various vehicle subsystems that support of the operation of vehicle 105. The vehicle subsystems may include a vehicle drive subsystem 142, a vehicle sensor subsystem 144, and/or a vehicle control subsystem 146. The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and/or one or more cameras or image capture devices. The vehicle sensor subsystem 144 may also include sensors configured to monitor internal systems of the vehicle 105 (e.g., an 02 monitor, a fuel gauge, an engine oil temperature).

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. The cameras may include one or more devices configured to capture a plurality of images of the environment of the vehicle 105. The cameras may be still image cameras or motion video cameras.

The vehicle control subsystem 146 may be configured to control operation of the vehicle 105 and its components. Accordingly, the vehicle control subsystem 146 may include various elements such as a throttle, a brake unit, a navigation unit, a redundant steering system and/or an autonomous control unit.

The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the GPS transceiver and one or more predetermined maps so as to determine the driving path for the vehicle 105. As further explained in FIG. 2, the redundant steering system may represent any combination of mechanisms that may be operable to adjust the heading of vehicle 105 in an autonomous mode or in a driver-controlled mode.

The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the GPS transceiver, the RADAR, the LIDAR, the cameras, and/or other vehicle subsystems to determine the driving path or trajectory for the vehicle 105.

Many or all of the functions of the vehicle 105 can be controlled by the in-vehicle control computer 150. The in-vehicle control computer 150 may include at least one data processor 170 (which can include at least one microprocessor) that executes processing instructions stored in a non-transitory computer readable medium, such as the data storage device 175 or memory. The in-vehicle control computer 150 may also represent a plurality of computing devices that may serve to control individual components or subsystems of the vehicle 105 in a distributed fashion. In some embodiments, the data storage device 175 may contain processing instructions (e.g., program logic) executable by the data processor 170 to perform various methods and/or functions of the vehicle 105, including those described in this patent document. For instance, the data processor 170 executes the operations associated with steering control module 165 for managing the redundant steering system. The data storage device 175 may contain additional instructions as well, including instructions to transmit data to, receive data from, interact with, or control one or more of the vehicle drive subsystem 142, the vehicle sensor subsystem 144, and the vehicle control subsystem 146. In some embodiment, additional components or devices can be added to the various subsystems or one or more components or devices (e.g., LIDAR or Radar shown in FIG. 1) can be removed without affecting the techniques described in this patent document for managing redundant steering system. The in-vehicle control computer 150 can be configured to include a data processor 170 and a data storage device 175.

The in-vehicle control computer 150 may control the function of the vehicle 105 based on inputs received from various vehicle subsystems (e.g., the vehicle drive subsystem 142, the vehicle sensor subsystem 144, and the vehicle control subsystem 146). For example, the in-vehicle control computer 150 may use input from the vehicle control subsystem 146 in order to control the steering system to avoid an obstacle detected by the vehicle sensor subsystem 144 and the steering control module 165, move in a controlled manner, or follow a path or trajectory based on output generated by the steering control module 165. In an example embodiment, the in-vehicle control computer 150 can be operable to provide control over many aspects of the vehicle 105 and its subsystems.

When a vehicle 105 is being operated in an autonomous mode, the steering control module 165 can send instructions to the steering motors included in the redundant steering system to control a steering angle of the steering wheel to steer the vehicle 105 to a desired direction. The steering motors may receive signals (e.g., position control command and/or torque control command) from the steering control module 165 to control the steering angle of the steering wheel. The position control command can instruct the steering motor to rotate to a desired position indicated in the position control command, the torque control command can instruct the steering motor to rotate by applying a desired torque indicated in the torque control command. For example, as further explained in FIG. 2, the steering control module 165 may send a command to operate the steering column steer drive and/or the steering gear steer drive to operate in a position control mode, and the steering control module can send the position control command to the steering column steer drive and/or the steering gear steer drive to control the amount of steering of the vehicle 105. In another example, as further explained in FIG. 2, the steering control module 165 may send a command to operate the steering column steer drive and/or the steering gear steer drive to operate in a torque control mode, and the steering control module can send a torque control command to the steering column steer drive and/or the steering gear steer drive to control the amount of steering of the vehicle 105.

Figure 2:
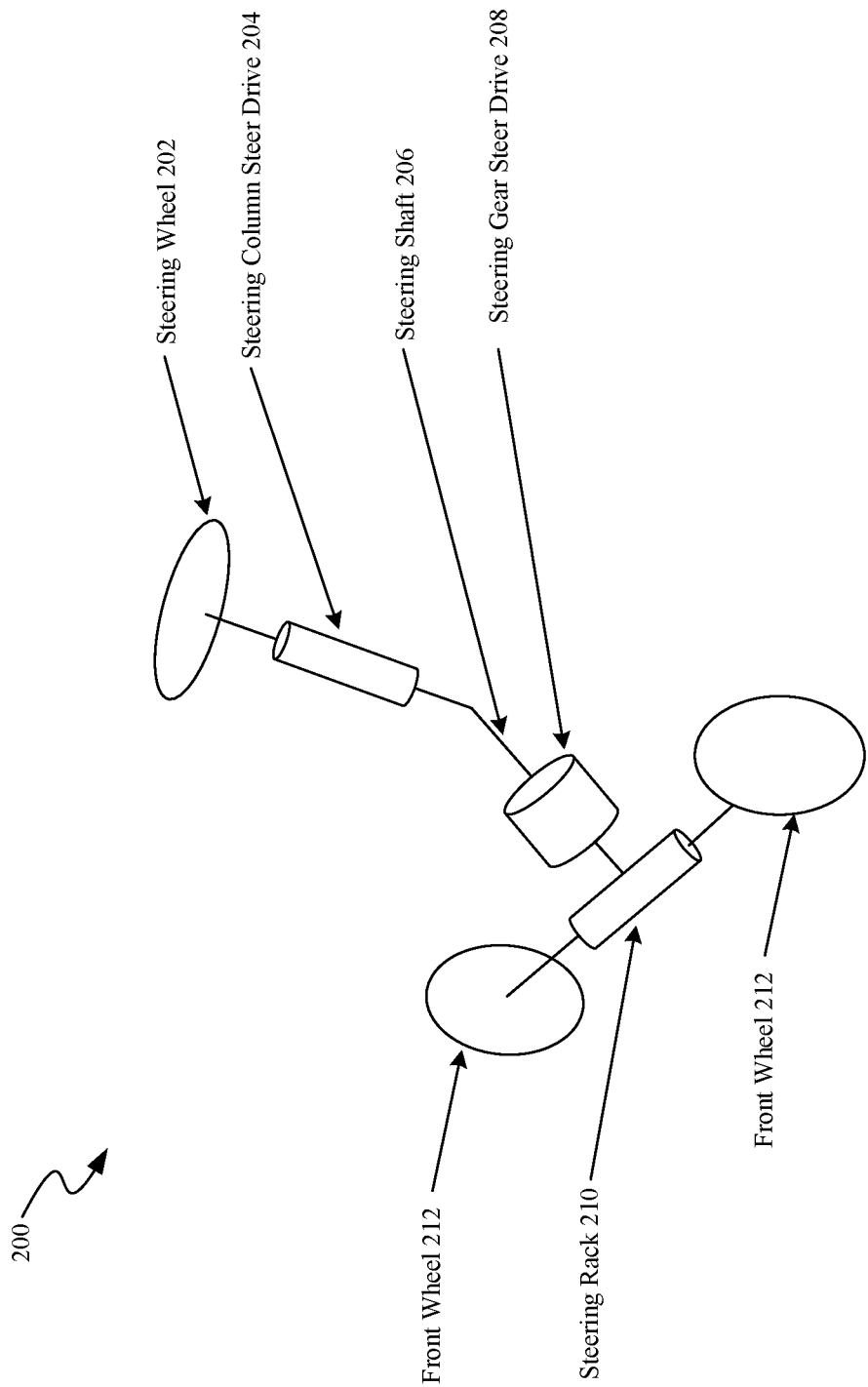
FIG. 2 shows a diagram of an exemplary redundant steering system coupled to the front wheels of a vehicle.

FIG. 2 shows a diagram of an exemplary redundant steering system 200 coupled to the front wheels of a vehicle. The redundant steering system 200 includes a steering wheel 202 that may be connected to a steering column steer drive 204 that can include a motor to assist the steering column to turn the steering shaft 206. The steering shaft 206 may be attached to or coupled to the steering gear steer drive 208. The steering shaft 206 can couple the steering column steer drive 204 to the steering gear steer drive 208. The steering gear steer drive 208 may include a motor to assist the steering rack 210 to turn the front wheels 212. The steering rack 210 may couple the front wheels 212 to the steering gear steer drive 208.

The motor in the steering column steer drive 204 and the motor in the steering column steer drive 204 can be coupled to the steering wheel 202 to provide a redundant steering system 200. The multiple motors enable the redundant steering system 200 to provide multiple ways to control the steering of the vehicle. In some embodiments, the steering control module may consider the motor that is part of the steering column steer drive 204 as the primary motor and the motor that is part of the steering gear steer drive 208 as the secondary motor. Thus, for example, if the motors in the steering column steer drive 204 fails, the steering control module can send command(s) to activate and operate the motor in the steering gear steer drive 208 to turn the steering wheel of the vehicle to a desired position. The steering column steer drive 204 and the steering gear steer drive 208 can include separate power supplies to control their respective motors.

In some embodiments, both the steering column steer drive 204 and the steering gear steer drive 208 may include a microcontroller and a memory, where the microcontroller may store in the memory control modes to operate the steering column steer drive 204 or the steering gear steer drive 208. The control modes may include (1) position, (2) torque, (3) power assist, and/or (4) passive. When the steering devices 204 and/or 208 are operated in a position control mode, the steering control module can provide a position control command, where the position control command may indicate to the steering system the amount of angular displacement or the position of the steering wheel. When the steering devices 204 and/or 208 are operated in a torque control mode, the steering control module can provide the torque control command, where the torque control command can indicate the amount of torque to be applied to the steering wheel.

When the steering devices 204 and/or 208 are operated in a power assist control mode the power steering feature can be enabled or disabled. When the steering devices 204 and/or 208 are operated in a passive control mode, the steering devices 204 and/or 208 does not process or operate on commands received from the steering control module and/or power assist control mode may be disabled so that power steering may be disabled. The steering devices 204 and/or 208 may be operated in one or more control modes. The steering control module may send commands to the steering devices 204 and/or 208 to enable or disable the control modes. The microcontrollers in both the steering column steer drive 204 and the steering gear steer drive 208 are configured to receive an activation command from the steering control module to activate or enable any one or both motors in the steering devices 204 and/or 208.

In FIG. 2, both the steering column steer drive 204 and the steering gear steer drive 208 can include one or more sensors. The sensor(s) in each of the steering column steer drive 204 and the steering gear steer drive 208 may also provide to the steering control module information related to a current position of a steering motor, current torque of the steering motor, velocity of the steering motor, and the control mode within which the motor is operating. The microcontroller in both the steering column steer drive 204 and the steering gear steer drive 208 is configured to provide an echoed control command as a feedback, where a steering position or torque command sent by the steering control module to the steering devices 204 and/or 208 is sent back by the microcontroller to the steering control module to indicate that the steering devices 204 and/or 208 have received the command.

The steering column steer drive 204 and/or the steering gear steer drive 208 can measure an amount of torque and/or the direction of torque applied to the steering system operated in an autonomous mode and/or applied to the steering wheel in a driver-controlled mode where the driver controls the steering wheel of the vehicle. When a driver decides to take control of the steering wheel, the driver may turn the steering wheel or refuse to let the steering wheel move to indicate that he or she wants to disengage autonomous mode operation and transition to a driver-controlled mode.

Figure 3:
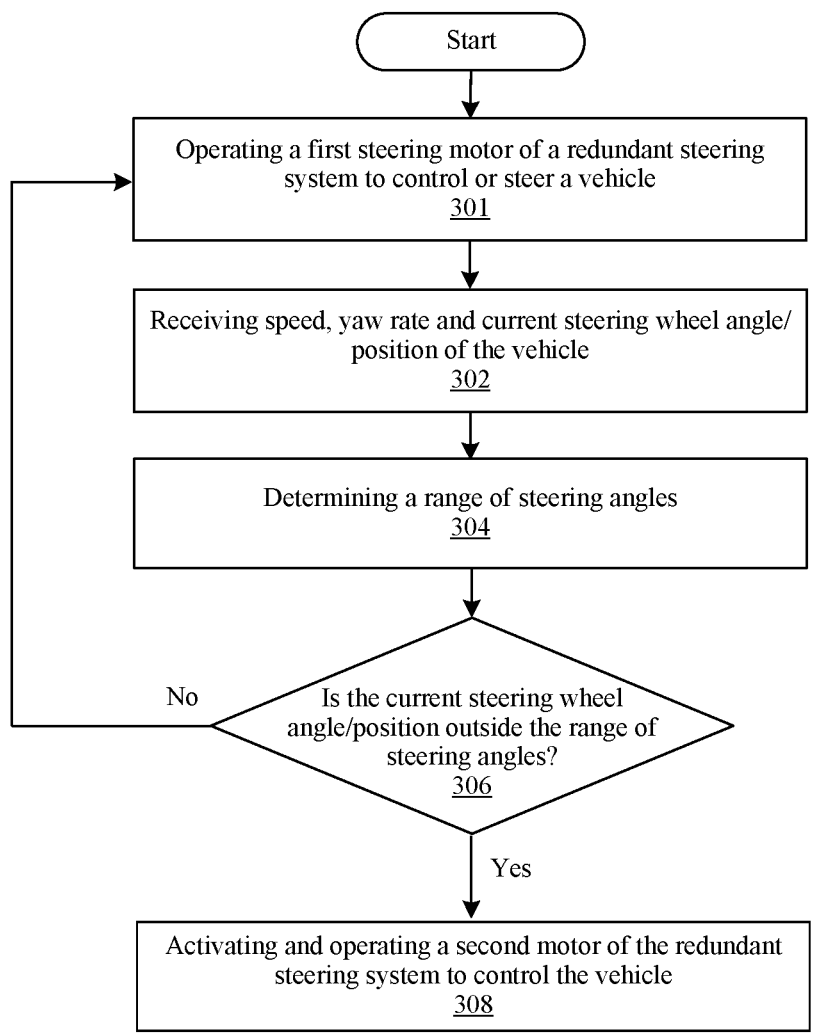
FIG. 3 shows an exemplary flow diagram of operations performed by a steering control module to manage a redundant steering system by determining whether a steering angle or position of a steering wheel is outside a range of steering angles.

FIG. 3 shows an exemplary flow diagram of operations performed by a steering control module to manage a redundant steering system by determining whether a steering angle or position of a steering wheel is outside a range of steering angles. The redundant steering system may include at least two steering motors that can independently steer the vehicle. At the operating operation 301, the steering control module can send a command to a microcontroller associated with a first steering motor (e.g., in steering column steer drive 204 in FIG. 2) of the redundant steering system to activate the first steering motor to execute commands sent by the steering control module. At the operating operation 301, a steering control module can send position or torque commands to a first steering motor to control or steer the vehicle, where the vehicle can be operated in an autonomous mode.

At the receiving operation 302, the steering control module receives a speed of a vehicle, a yaw rate of the vehicle, and the current steering wheel position of the vehicle after the first steering motor executes the command from the steering control module to steer the steering wheel at a desired angle. The current steering wheel position can be related to and can describe the steering wheel angle. In some embodiments, a current steering wheel angle can be used instead of current steering wheel position. Yaw rate can be provided by an IMU in the vehicle. Since the steering wheel position is controlled by the first steering motor, the current steering wheel position value can be obtained from a sensor associated with the first steering motor (e.g., in one of the steering devices 204 or 208 in FIG. 2), where the sensor provides a current position of the first steering motor. The current position of the first steering motor can be related to the current steering wheel position value based on a linear equation.

The speed and yaw rate of the vehicle are dependent at least in part on the current steering wheel position. Thus, based on the speed and the yaw rate of the vehicle, at the determining operation 304, the steering control module can determine an expected range of steering angles that can be used to manage the redundant steering system. A steering wheel angle can describe a steering wheel position, and an expected range of steering angles can be considered a range of values within which the steering wheel can be expected to be rotated to steer the vehicle. In some embodiments, the expected range of steering angles can be compared to the current steering wheel position to determine whether a motor in the redundant steering system is operating within a tolerable bound. For example, if the vehicle is driven on a highway where the vehicle is driven at a high speed (e.g., 65 mph) and low yaw rate (e.g., 2 degree/sec), the steering control module can estimate that the actual range of steering angles can be 5 degrees to 8 degrees. A range of 5 degrees to 8 degrees describe the angular position of the steering wheel relative to a neutral steering wheel position, where the neutral steering wheel position enables the vehicle to be driven in a relatively straight direction. In another example, if the vehicle is driven on a highway where the vehicle is driven at a high speed (e.g., 65 mph) and has a high rate (e.g., 10 degree/sec), the steering control module can determine that the actual range of steering angles can be 18 degrees to 20 degrees. In yet another example, if the vehicle is driven on a local road at a low speed (e.g., 25 mph) and has a low yaw rate (e.g., 4 degree/sec), the steering control module can determine that the expected range of steering angles can be 10 degrees to 20 degrees.

At the determining operation 306, if the steering control module determines that the current steering wheel position is outside the expected range of steering angles, then the steering control module can determine that the first steering motor is not operating as desired or may be faulty and the steering control module can perform an activating operation 308. At the activating operation 308, the steering control module can send a command to a microcontroller associated with a second steering motor (e.g., in steering gear steer drive 208 in FIG. 2) of the redundant steering system to activate or enable the second steering motor to execute commands sent by the steering control module. At the activating operation 308, the steering control module can send position or torque command(s) to the second steering system to steer the vehicle. In some embodiments, at the activation operation 308, the steering control module can send a command that deactivates the first steering motor.

At the determining operation 306, if the steering control module determines that the current steering wheel position is within the expected range of steering angles, then the steering control module can determine that the first steering motor is operating properly and can continue to operate the first steering motor at the operating operation 301.

The first steering motor and the second steering motors may be located at different positions or locations in the steering system, which can cause the two steering motors to have different offsets. Thus, the content of the command to move the steering wheel to a position of, for example, 45 degrees may be different for the first steering motor than that the second steering motor. In some embodiments, the first steering motor and the second steering motor's offsets may be pre-determined so that the steering control module can send the proper commands to the first and second steering motors based on the pre-determined offsets. For example, a command sent to the first steering motor can be based in part on a first pre-determined offset that describes a position of the first steering motor relative to a neutral steering wheel position, and a command sent to the second steering motor can be based in part on a second pre-determined offset that describes a position of the second steering motor relative to the neutral steering wheel position. In some embodiments, the steering control module can determine the offset of a steering motor based on determining whether the vehicle's yaw rate is consistent with a position or torque command sent to the steering motor to turn the steering of the vehicle.

In some other embodiments, the steering control module can compensate for one or more other offsets associated with the steering system when the steering control module performs operations 304-308 to avoid false positive conditions where a first steering motor is determined to be faulty but is not. For example, the steering system may be associated with a third pre-determined offset that can quantify the degree(s) by which the wheels of the vehicle are offset when the steering wheel is in a neutral position. For example, a value of +2 degrees can indicate that when the steering wheel is in a neutral position, the vehicle will veer 2 degrees to the right on a road. The steering control module can compensate for the offset values when the steering control module commands the first steering motor and/or the second steering motor to steer the vehicle.

In FIG. 3, at the determining operation 304, the expected range of steering angles can be determined by factoring any one or more of the pre-determined offset value described in this patent document to avoid false positives. In one of the examples mentioned above for the expected range of steering angles, if the vehicle is driven at 65 mph and has a yaw rate of 2 degree/sec, then the expected range of steering angles can be 5 to 8 degrees. In this example, if the pre-determined offset value of the first steering motor is +2 degrees, then steering control module can determine that the expected range of steering angles to be 7 to 10 degrees because the current steering wheel position should reflect the compensated offset value. In such embodiments, if the steering control module determines that the current steering wheel position is outside the expected range of steering angles that factors in the offset value, then the steering control module can determine that the sensor associated with the first steering motor may be faulty or the first steering motor may be faulty and active the second steering motor as described in the activating operation 308.

In some embodiments, the steering control module can compensate for torque applied by a driver on the steering wheel when the steering control module performs operations 304-308 to avoid false positive conditions where a first steering motor is determined to be faulty but is not. In some scenarios, a driver that sits behind the steering wheel may place his or her hand(s) on the steering wheel. The driver's hand(s) on the steering wheel may result in a torque being applied on the various components of the steering system. This torque can change the current steering wheel position that is received at the receiving operation 302, which can lead to a false positive condition if the new current steering wheel position is outside the expected range of steering angles.

To compensate for such scenarios, the steering control module can obtain from a sensor associated with the first steering motor (e.g., in one of the steering devices 204 or 208 in FIG. 2) a current torque of the first steering motor. At the operating operation 301, the steering control module can determine an expected torque to be applied by the first steering motor based on the position or torque commands provided by the steering control module. In the case of the position command, the steering control module can determine an expected torque to be applied by the first steering motor based on a pre-determined equation or table that can provide a torque value based at least on the commanded position of the first steering motor and the speed of the vehicle. The sensor associated with the first steering motor can send to the steering control module a value indicative of a torque applied by or on the first steering motor. In some embodiments, at the determining operation 304, if the steering control module determines that the torque applied by or on the first steering motor is outside a tolerable range of torque values that includes the expected torque value (e.g., a range of within 5% of the expected torque value), then the steering control module can determine that a driver may be controlling the steering wheel and generating torque and the steering control module can increase the expected range of steering angles to avoid false positive conditions as described in this patent document.

In some embodiments, if the steering control module determines that the torque applied by or on a steering motor is greater than a pre-determined threshold value that is outside a tolerable range of torque values, then the steering control module may determine that the driver intends to override the steering of the autonomous vehicle and wants to operate the steering wheel. In such embodiments, the steering control module stops sending commands to control the steering motor so that the driver can steer the vehicle.

Figure 4:
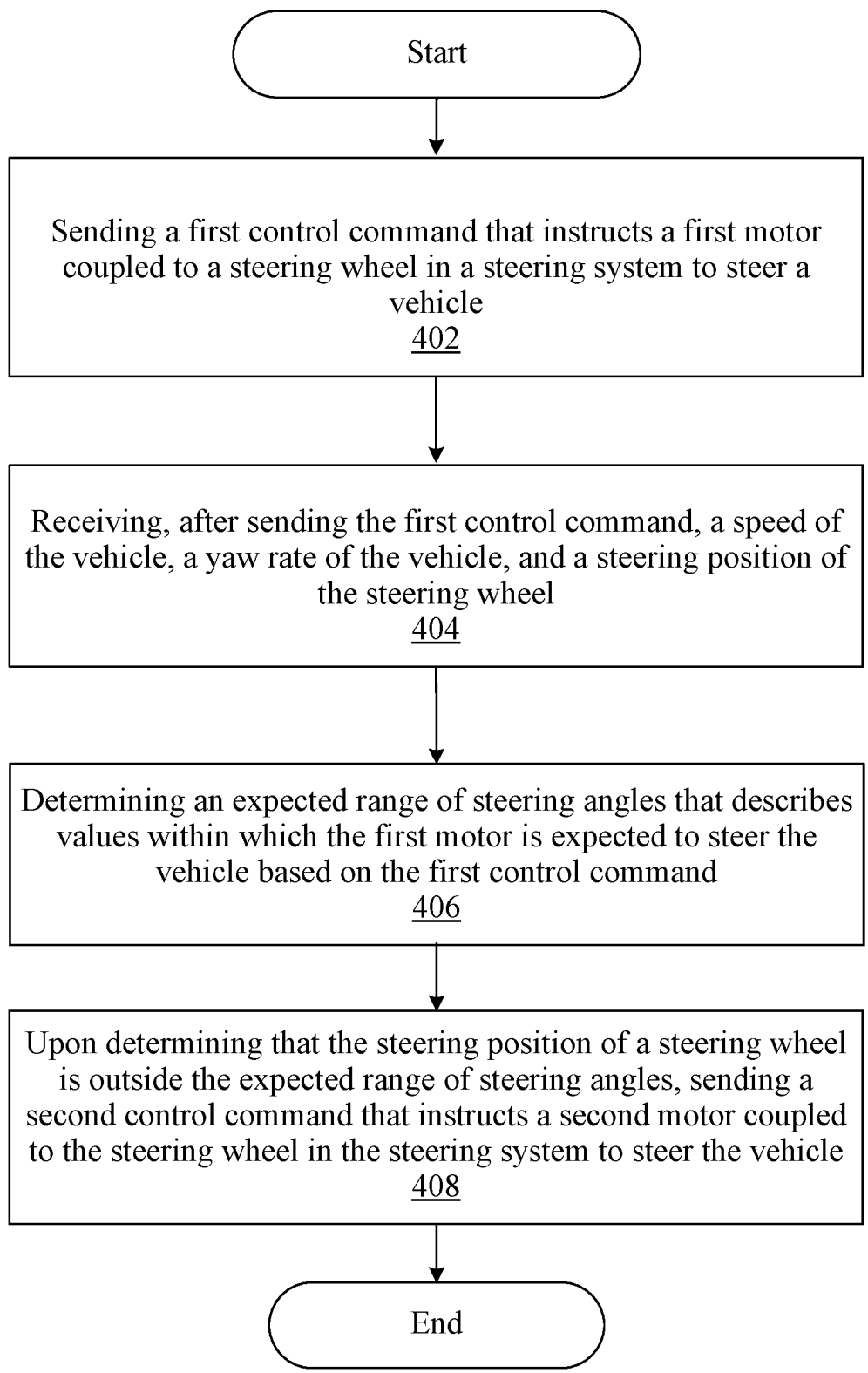
FIG. 4 shows another exemplary flow diagram of operations performed by a steering control module to manage a redundant steering system when a steering position of a steering wheel is outside an expected range of steering angles.

FIG. 4 shows another exemplary flow diagram of operations performed by a steering control module to manage a redundant steering system when a steering position of a steering wheel is outside an expected range of steering angles. At the sending operation 402, the steering control module sends a first control command that instructs a first motor coupled to a steering wheel in a steering system to steer a vehicle. At the receiving operation 404, the steering control module receives, after sending the first control command, a speed of the vehicle, a yaw rate of the vehicle, and a steering position of the steering wheel.

At the determining operation 406, the steering control module determines an expected range of steering angles that describes values within which the first motor is expected to steer the vehicle based on the first control command, where the expected range of steering angles are determined as a function of at least the speed of the vehicle and the yaw rate of the vehicle. In some embodiments, the expected range of steering angles are determined as the function at least the speed of the vehicle, the yaw rate of the vehicle, and the first pre-determined offset of the first motor. In some embodiments, the expected range of steering angles are determined as the function at least the speed of the vehicle, the yaw rate of the vehicle, and a third pre-determined offset that quantifies an amount by which the steering wheel of the vehicle is offset when the steering wheel is in a neutral position.

At the determining operation 408, the steering control module, upon determining that the steering position of a steering wheel is outside the expected range of steering angles, sends a second control command that instructs a second motor coupled to the steering wheel in the steering system to steer the vehicle.

In some embodiments, the first control command is based in part on a first pre-determined offset of a first position of the first motor within the steering system, and the second control command is based in part on a second pre-determined offset of a second position of the second motor within the steering system. In some embodiments, upon determining that the steering position of the steering wheel is outside the expected range of steering angles, sending a third command that instructs the first motor to deactivate. In some embodiments, the first control command or the second control command include: a position control command that indicates an amount of angular displacement or a position of a steering wheel of the steering system to be applied by the first motor or the second motor, or a torque control command that indicates an amount of torque to apply to the steering wheel by the first motor or the second motor, respectively.

In some embodiments, the method described in FIG. 4, further includes receiving, from the first motor, a measured torque value that describes torque being applied by or on the first motor in response to the first control command, determining an expected torque value to be applied by the first motor based on the first control command, and increasing the expected range of steering angles upon determining that the measured torque value is outside a range of torque values that includes the expected torque value.

In this document the term "exemplary" is used to mean "an example of" and, unless otherwise stated, does not imply an ideal or a preferred embodiment. In this document, the term "coupled to" can include direct coupling or indirect coupling.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method, comprising:
    sending a first command that causes a first motor in a steering system to steer a vehicle;
    receiving a steering position of a steering wheel after the first motor is caused to steer the vehicle in accordance with the first command;
    performing a first determination that the steering position is within a range of values, wherein the range of values is a function of at least a speed of the vehicle and a yaw rate of the vehicle; and
    sending, in response to the first determination, a second command that causes the first motor in the steering system to steer the vehicle.

2. The method of claim 1, further comprising:
    performing a second determination that the steering position is outside of the range of values; and
    sending, in response to the second determination, a third command that causes a second motor in the steering system to steer the vehicle.

3. The method of claim 2, further comprising:
    sending a command that deactivates the first motor in response to the second determination.

4. The method of claim 2, wherein the third command causes the second motor to activate or be enabled to execute commands.

5. The method of claim 2, wherein the third command is based in part on a second pre-determined offset that describes a position of the second motor relative to a neutral position.

6. The method of claim 5, wherein the second pre-determined offset of the second motor is different from a first pre-determined offset of the first motor.

7. The method of claim 2, wherein the first motor and the second motor are located at different locations in the steering system.

8. A non-transitory computer readable storage medium having code stored thereon, the code, when executed by a processor, causing the processor to implement a method comprising:
    sending a first command that causes a first motor in a steering system to steer a vehicle;
    receiving a steering position of a steering wheel after the first motor is caused to steer the vehicle in accordance with the first command;
    performing a first determination that the steering position is within a range of values, wherein the range of values is a function of at least a speed of the vehicle and a yaw rate of the vehicle; and
    sending, in response to the first determination, a second command that causes the first motor in the steering system to steer the vehicle.

9. The non-transitory computer readable storage medium of claim 8, wherein the first command and the second command are based on a first pre-determined offset that describes a first position of the first motor relative to a neutral position.

10. The non-transitory computer readable storage medium of claim 9, wherein the range of values is based on the speed of the vehicle, the yaw rate of the vehicle, and the first pre-determined offset.

11. The non-transitory computer readable storage medium of claim 8,
    wherein the first command and the second command include position control commands that indicates amounts of angular displacement or positions of the steering wheel to be applied by the first motor.

12. The non-transitory computer readable storage medium of claim 8,
    wherein the first command and the second command include torque control commands that indicates amounts of torque to apply to the steering wheel by the first motor.

13. The non-transitory computer readable storage medium of claim 8, wherein the method further comprises:
    receiving indications that the first command and the second command have been received by the first motor.

14. An apparatus for controlling an autonomous vehicle, the apparatus comprising a processor configured to implement a method, the processor configured to:

send a first command that causes a first motor in a steering system to steer a vehicle;

receive a steering position of a steering wheel after the first motor is caused to steer the vehicle in accordance with the first command;

perform a first determination that the steering position is within a range of values, wherein the range of values is a function of at least a speed of the vehicle and a yaw rate of the vehicle; and send, in response to the first determination, a second command that causes the first motor in the steering system to steer the vehicle.

15. The apparatus of claim 14, wherein the first command and the second command are based on a first pre-determined offset that describes a first position of the first motor relative to a neutral position.

16. The apparatus of claim 15, wherein the range of values is based on the speed of the vehicle, the yaw rate of the vehicle, and the first pre-determined offset.

17. The apparatus of claim 14,
wherein the first command and the second command include position control commands that indicates amounts of angular displacement or positions of the steering wheel to be applied by the first motor.

18. The apparatus of claim 14, wherein the first command and the second command include position commands or torque commands.

19. The apparatus of claim 14, wherein the steering position indicates a steering angle of the steering wheel.

20. The apparatus of claim 14, wherein the steering position is received from a sensor associated with the first motor.

* * * * *